US012461486B2

(12) United States Patent
Kawanago

(10) Patent No.: US 12,461,486 B2
(45) Date of Patent: Nov. 4, 2025

(54) IMAGE FORMING APPARATUS

(71) Applicant: Konica Minolta, Inc., Tokyo (JP)

(72) Inventor: Takashi Kawanago, Fuchu (JP)

(73) Assignee: KONICA MINOLTA, INC., Tokyo (JP)

( * ) Notice: Subject to any disclaimer, the term of this patent is extended or adjusted under 35 U.S.C. 154(b) by 112 days.

(21) Appl. No.: 18/482,089

(22) Filed: Oct. 6, 2023

(65) Prior Publication Data

US 2024/0118658 A1 Apr. 11, 2024

(30) Foreign Application Priority Data

Oct. 6, 2022 (JP) ................................ 2022-161414

(51) Int. Cl.
*G03G 21/20* (2006.01)
*G03G 15/16* (2006.01)

(52) U.S. Cl.
CPC ......... *G03G 21/203* (2013.01); *G03G 15/161* (2013.01)

(58) Field of Classification Search
CPC ........................... G03G 15/161; G03G 21/203
See application file for complete search history.

(56) References Cited

U.S. PATENT DOCUMENTS 5,153,653 A * 10/1992 Fuma ................. G03G 15/1655 399/312
2008/0101806 A1* 5/2008 Tabata ............... G03G 15/1695 399/45
2016/0243854 A1* 8/2016 Chiba ..................... B41J 11/007
2017/0361632 A1* 12/2017 Toyama ............... C09D 11/322
2024/0094652 A1* 3/2024 Yoshihara ............ G03G 9/0821

FOREIGN PATENT DOCUMENTS

JP 2015-011046 1/2015

* cited by examiner

*Primary Examiner* — Stephanie E Bloss
*Assistant Examiner* — Michael A Harrison
(74) *Attorney, Agent, or Firm* — BakerHostetler

(57) ABSTRACT

An image forming apparatus forming an image on a recording medium, includes: a developing device that forms a toner image on an image carrier, a transfer device that transfers the toner image formed by the developing device to a recording medium at a transfer position, and a charge eliminator that is arranged upstream of the transfer position in a conveyance direction of the recording medium and eliminates charges of the recording medium in a non-contact manner, wherein the charge eliminator is an ionizer and is arranged at a position which is away by a predetermined distance from a conductor for moving ionic particles generated at the time of charge elimination.

37 Claims, 6 Drawing Sheets

FIG. 8A

| | Rolled paper | Charge eliminator | Image defect |
|---|---|---|---|
| Example 1 | Tack film 1 | Ionizer | A |
| Example 2 | Tack film 2 | Ionizer | A |
| Example 3 | Tack plain paper | Ionizer | A |
| Comparative Example 1 | Tack film 1 | None | C |
| Comparative Example 2 | Tack film 1 | Charge elimination string | B |
| Comparative Example 3 | Tack film 2 | None | C |
| Comparative Example 4 | Tack film 2 | Charge elimination string | B |
| Comparative Example 5 | Tack plain paper | None | B |

FIG. 8B

| | Cut paper | Charge eliminator | Image defect |
|---|---|---|---|
| Example 1 | Tack film 1 | Ionizer | A |
| Example 2 | Tack film 2 | Ionizer | A |
| Example 3 | Tack plain paper | Ionizer | A |
| Comparative Example 1 | Tack film 1 | None | C |
| Comparative Example 2 | Tack film 1 | Charge elimination string | B |
| Comparative Example 3 | Tack film 2 | None | C |
| Comparative Example 4 | Tack film 2 | Charge elimination string | B |
| Comparative Example 5 | Tack plain paper | None | B |

IMAGE FORMING APPARATUS

CROSS-REFERENCE TO RELATED APPLICATIONS

This application claims priority to Japanese Patent Application No. 2022-161414 filed Oct. 6, 2022, the entire disclosure of which is incorporated herein by reference.

TECHNICAL FIELD

The present invention relates to an image forming apparatus.

DESCRIPTION OF THE RELATED ART

It is conventionally known an electrophotographic image forming apparatus in which a toner image is formed by developing an electrostatic latent image formed on a photoreceptor with toner, the formed toner image is transferred to a film made of resin or the like by a transfer device, and the transferred toner image is fixed by a fixer to form an image on the film.

When a toner image is formed on a film, the film is easily charged due to contact with a conveyance guide or the like since a surface resistance of the film is higher than that of plain paper. The charged film may discharge due to transfer bias that is applied when the toner image is transferred, to cause transfer defects. Disturbance of the image due to the transfer defects is particularly easy to be visually recognized when a base layer of a light color such as white is formed and an image of other colors is superimposed thereon.

As a countermeasure against transfer defects caused when a toner image is formed on a film, there is disclosed, for example, a configuration in which a brush-shaped charge eliminating member that contacts the film upstream of a transfer position is provided, and charge elimination is performed before transfer (for example, see JP-A-2015-11046).

SUMMARY OF THE INVENTION

However, in the configuration described in JP-A-2015-11046, since the brush-shaped charge eliminating member is in contact with the film being conveyed for a long period of time, a part of the brush that has deteriorated with use is cut and adhered to the film. When a transfer bias is applied to the film to which the part of the brush is attached, the transfer bias reacts to the part of the brush, and there is a possibility that more transfer defects occur.

An object of the present invention is to provide an image forming apparatus capable of suppressing occurrence of transfer defects and outputting an image with high quality.

To achieve at least one of the abovementioned objects, according to an aspect of the present invention, an image forming apparatus reflecting one aspect of the present invention is an image forming apparatus forming an image on a recording medium, the image forming apparatus including: a developing device that forms a toner image on an image carrier, a transfer device that transfers the toner image formed by the developing device to a recording medium at a transfer position, and a charge eliminator that is arranged upstream of the transfer position in a conveyance direction of the recording medium and eliminates charges of the recording medium in a non-contact manner, wherein the charge eliminator is an ionizer and is arranged at a position which is away by a predetermined distance from a conductor for moving ionic particles generated at the time of charge elimination.

To achieve at least one of the abovementioned objects, according to an aspect of the present invention, an image forming apparatus reflecting one aspect of the present invention is an image forming apparatus forming an image on a recording medium, the image forming apparatus including: a developing device that forms a toner image on an image carrier with white toner and toner of colors other than white, a transfer device that transfers the toner image formed by the developing device to a recording medium at a transfer position, and a charge eliminator that is arranged upstream of the transfer position in a conveyance direction of the recording medium and eliminates charges of the recording medium in a non-contact manner.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 8A is a chart showing an example of experimental results using rolled paper.

FIG. 8B is a chart showing an example of experimental results using cut paper.

DETAILED DESCRIPTION

Hereinafter, one or more embodiments of the present invention will be described with reference to the drawings. However, the scope of the invention is not limited to the disclosed embodiments.

An image forming apparatus 100 of the present embodiment is a device that forms an image on a recording medium. In the present embodiment, a configuration using continuous paper as the recording medium is exemplified and explained, but the present invention is not limited thereto. For example, instead of the continuous paper, a sheet of paper cut to a standard size may be used. In the present embodiment, rolled paper is used as the continuous paper. The base material of recording medium (rolled paper) is not particularly limited, and may be a film made of resin, or may be paper such as plain paper or high-quality paper containing paper pulp as a main component. In the present embodiment, a film made of resin is used as a base material of the recording medium (rolled paper).

Figure 1:
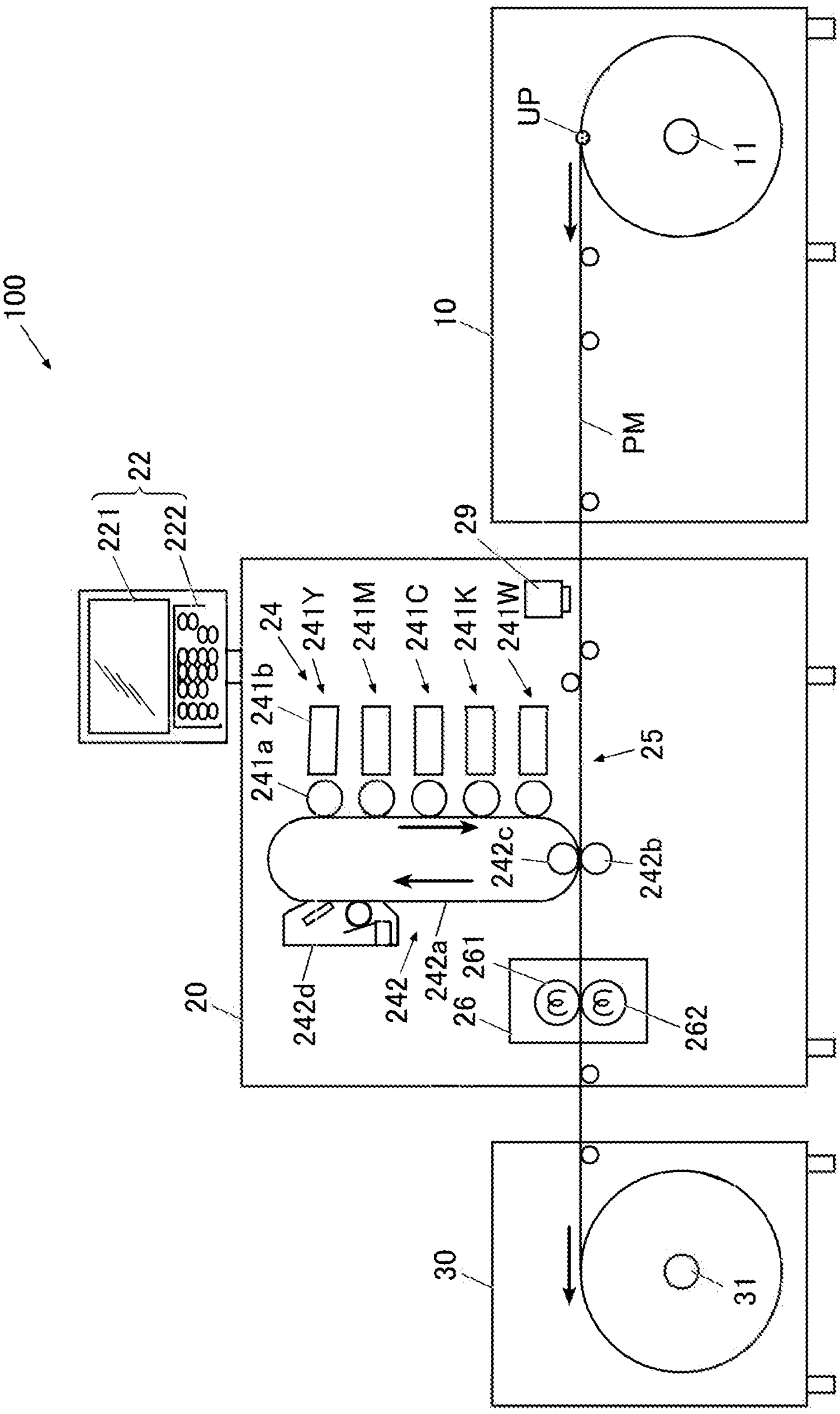
FIG. 1 is a diagram showing a schematic configuration of an image forming apparatus according to the present embodiment.

As illustrated in FIG. 1, the image forming apparatus 100 is configured by connecting a paper feeding device 10, a main unit 20, and a winding device 30 from the upstream side along a conveyance direction of rolled paper PM. The paper feeding device 10 and the winding device 30 are used when continuous paper such as the rolled paper PM is used. However, the image forming apparatus 100 may or may not be configured such that the paper feeding device 10 or the winding device 30 is connected to the main unit 20 in a separated manner and may or may not be configured such that the paper feeding device 10 or the winding device 30 is connected to the main unit 20 in an integral manner.

The paper feeding device (paper feeder) 10 is a device in which the rolled paper PM wound in a roll shape is set and which feeds the rolled paper PM to the main unit 20. In a housing of the paper feeding device 10, the roll-shaped rolled paper PM is wound around a support shaft 11 and is rotatably held. The paper feeding device 10 conveys the rolled paper PM wound around the support shaft 11 to the main unit 20 at a constant rate via a plurality of conveyance roller S. The sheet feeding operation of the paper feeding device 10 is controlled by a controller 21 (hardware processor) included in the main unit 20.

The winding device 30 is a device that winds and stores the rolled paper PM conveyed from the main unit 20. In a housing of the winding device 30, the rolled paper PM is wound around the support shaft 31 and held in a roll shape. The winding device 30 winds the rolled paper PM conveyed from the main unit 20 onto the support shaft 31 at a constant velocity via a plurality of conveyance roller S. The winding operation of the winding device 30 is controlled by the controller 21 included in the main unit 20.

The main unit 20 is an intermediate transfer type of color image forming apparatus using an electrophotographic processing technique. That is, the main unit 20 forms an image by primarily transferring each of color toner images of Y (yellow), M (magenta), C (cyan), K (black), and W (white) formed on photoreceptor drums 241*a* respectively to an intermediate transfer belt 242*a* to superimpose the five color toner images on an intermediate transfer belt 242*a*, and then secondary transferring the superimposed color toner images to the rolled paper PM fed from the paper feeding device 10. In addition, the main unit 20 employs a tandem system in which the photoreceptor drums 241*a* corresponding to the colors of YMCKW respectively are arranged in series in the order of YMCKW in a traveling direction of the intermediate transfer belt 242*a*, and the respective color toner images are sequentially transferred to the intermediate transfer belt 242*a* in a single step.

Figure 2:
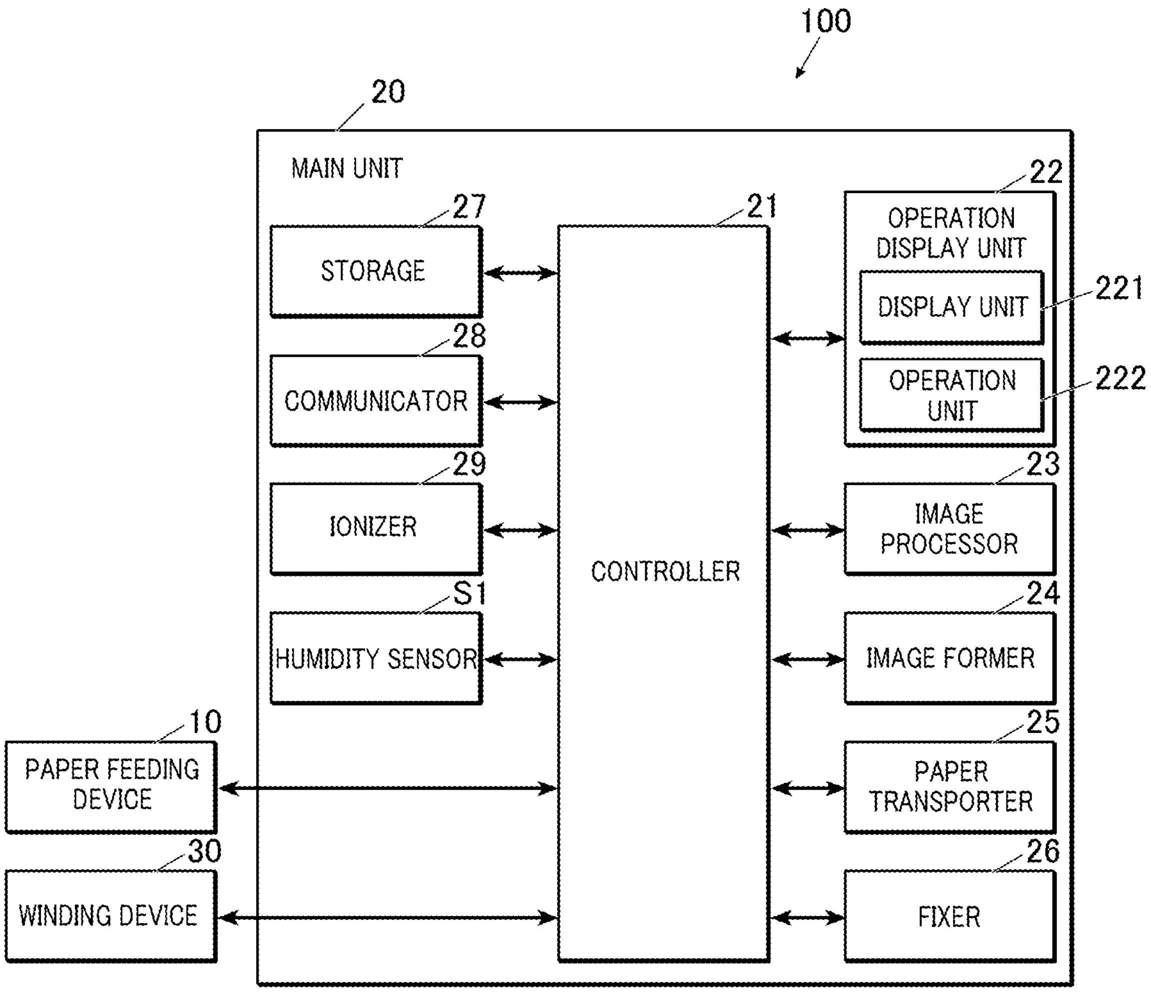
FIG. 2 is a functional block-diagram showing a control structure of the image forming apparatus according to the present embodiment.

As shown in FIGS. 1 and 2, the main unit 20 includes the controller 21, an operation display unit 22, an image processor 23, an image former 24, a paper transporter 25, a fixer 26, a storage 27, a communicator 28, and an ionizer 29.

The controller 21 includes a Central Processing Unit (CPU), a Random Access Memory (ROM), a Read Only Memory (RAM) or the like. The CPU reads a program corresponding to the content of the process from the ROM, decompresses the program in RAM, and controls operation of each block or the like in the main device 20 in a centralized manner while cooperating with the decompressed program. At this time, various types of data stored in the storage 27 are referred to.

For example, the controller 21 controls charge elimination operation of the ionizer 29.

The operation display unit 22 includes, for example, a liquid crystal display (LCD: Liquid Crystal Display) with a touch panel, and functions as a display unit 221 and an operation unit (operation receiver) 222.

The display unit 221 displays various operation screens, image states, operation states of respective functions, and the like in accordance with display control signals inputted from the controller 21.

The operation unit 222 includes various operation keys such as a numeric keypad and a start key, receives various input operations of the user, and outputs operation signals to the controller 21.

The image processor 23 includes circuits or the like for performing a digital image process on image data (input image data) transmitted from an external device according to an initial setting or a user's setting. For example, the image processor 23 performs gradation correction based on gradation correction data (gradation correction table) under control of the controller 21. In addition, the image processor 23 performs various correction processes such as color correction and shading correction, compression processes, and the like on the inputted image data in addition to the gradation correction. The image former 24 is controlled based on the processed image data.

The image former 24 includes image forming units 241Y, 241M, 241C, 241K and 241W, an intermediate transcription unit 242 and the like for forming an image with color toner of Y component, M component, C component, K component, and W component based on the input image data. The image forming units 241Y, 241M, 241C, 241K, and 241W for the Y component, M component, C component, K component, and W component, respectively, have the same structure. For convenience of illustration and description, elements having the common structure are denoted by the same reference numeral, and in the case of distinguishing between them, Y, M, C, K, or W is added to the same reference numeral. In FIG. 1, only constituents of the image forming unit 241Y for the Y component are denoted by reference numerals, and reference numerals for constituents of each of the remaining image forming units 241M, 241C, 241K, 241W are omitted.

The image forming unit 241 includes the photoreceptor drum 241*a*, an exposure device (not shown), a developing apparatus 241*b*, a charger (not shown), a drum cleaner (not shown), and the like.

The photoreceptor drum (image carrier) 241*a* is a negatively charged organic photoconductor (OPC: Organic Photo-Conductor) in which an undercoat layer (UCL: Under Coat Layer), a charge generating layer (CGL: Charge Generation Layer), and a charge transporting layer (CTL: Charge Transport Layer) are sequentially laminated on a peripheral surface of a conductive cylindrical body (aluminum tube stock) made of aluminum having a drum diameter of 100 [mm], for example. The charge generating layer is formed of an organic semiconductor in which a charge generating material (e.g., a phthalocyanine pigment) is dispersed in a resin binder (e.g., polycarbonate), and generates a pair of positive charges and negative charges by exposure with an exposure device. The charge transport layer is formed by dispersing a hole transport material (electron donating nitrogen-containing compound) in a resin binder (for example, a polycarbonate resin), and transports positive charges generated in the charge generation layer to the surface of the charge transport layer. The controller 21 controls a drive current supplied to a drive motor (not shown) for rotating the photoreceptor drum 241_a_, whereby the photoreceptor drum 241_a_ is rotated at a constant peripheral velocity.

The charger uniformly charges the photoreceptor drum 241_a_ which has photoconductive to a negative polarity.

An exposure device is constituted by, for example, a solid-state laser, and irradiates a photoreceptor drum 241_a_ with laser beams corresponding to images of respective color component. Positive charges are generated in the charge generating layer of a photoreceptor drum 241_a_ and transported to a surface of the charge transporting layer, whereby surface charges (negative charges) of the photoreceptor drum 241_a_ are neutralized. An electrostatic latent image of each color component is formed on a surface of the photoreceptor drum 241_a_ by a potential difference from the surroundings.

A developing apparatus (developing unit) 241_b_ is a two-component developing type of photoreceptor drum that visualizes an electrostatic latent image by depositing toner of each color component on the surface of a photoreceptor drum 241_a_ to form a toner image. In the present embodiment, the developing apparatus 241_b_ forms a toner image on a photoreceptor drum 241_a_ using white toner (W) and other color toners (Y, M, C, K) other than white.

A drum cleaner includes a drum cleaning blade or the like that is in sliding contact with the surface of the photoreceptor drum 241_a_ and removes residual toner remaining on the surface of the photoreceptor drum 241_a_ after the primary transfer.

The intermediate transfer unit 242 includes an intermediate transfer belt 242_a_ primary transfer roller (not shown), a plurality of support rollers (not shown), a secondary transfer roller 242_b_, a backup roller 242_c_, a belt cleaning device 242_d_, and the like.

The intermediate transfer belt 242_a_ is formed of an endless belt and is looped around a plurality of support rollers. At least one of the plurality of support rollers is constituted by a driving roller, and the others are constituted by driven rollers. For example, it is preferable that the roller disposed on the downstream side in the belt traveling direction than the primary transfer roller for the W component is a drive roller. This makes it easier to keep the running speed of the belt at the primary transfer device constant. The intermediate transfer belt 242_a_ travels at a constant velocity in the direction of the arrow as the drive roller rotates.

The intermediate transfer belt 242_a_ is an electrically conductive and elastic belt and has a high resistivity layer with a volume resistivity of 8-11 [log (Ω cm)]. The intermediate transfer belt 242_a_ is rotationally driven by a control signal from the controller 21. The intermediate transfer belt 242_a_ is not limited in material, thickness, and hardness as long as it has conductivity and elasticity.

The primary transfer roller is disposed on the inner peripheral surface of the intermediate transfer belt 242_a_ so as to face the photoreceptor drum 241_a_ of each color component. A primary transfer nip for transferring a toner image from the intermediate transfer belt 242_a_ to the photoreceptor drum 241_a_ is formed by pressing the primary transfer roller against the intermediate transfer belt 242_a_.

The secondary transfer roller (a transfer unit) 242_b_ is disposed on the outer peripheral surface side of the intermediate transfer belt 242_a_ so as to face the backup roller 242_c_ disposed on the downstream side of the drive roller in the belt traveling direction. A secondary transfer nip for transferring toner images from the intermediate transfer belt 242_a_ to the rolled paper PM is formed by pressing the transfer roller (secondary transfer roller) 242_c_ against the secondary backup roller 242_b_ with the intermediate transfer belt 242_a_ therebetween. The secondary transfer roller 242_b_ transfers the toner images formed by developing apparatuses 241_b_ to the rolled paper PM at a transfer position (secondary transfer nip).

When the intermediate transfer belt 242_a_ passes through the primary transfer nip, the toner images on the photoreceptor drums 241_a_ are sequentially transferred to the intermediate transfer belt 242_a_ in a superimposed manner. Specifically, the toner images are electrostatically transferred to the intermediate transfer belt 242_a_ by applying a primary transfer bias to the primary transfer roller and applying charges having a polarity opposite to that of the toner to a back surface side of the intermediate transfer belt 242_a_ (the side in contact with the primary transfer roller).

Thereafter, when the rolled paper PM passes through the secondary transfer nip, the toner images on the intermediate transfer belt 242_a_ are secondarily transferred onto the rolled paper PM. Specifically, the toner images are electrostatically transferred onto the rolled paper PM by applying a secondary transfer bias to the backup roller 242_c_ and applying charges having a polarity opposite to that of the toner to back surface side of the rolled paper PM (the side in contact with the secondary transfer roller 242_b_). The rolled paper PM on which the toner images have been transferred is conveyed toward a fixer 26.

The belt cleaning device 242_d_ removes the residual toner remaining on the intermediate transfer belt 242_a_ after the secondary transfer.

The paper transporter 25 is conveyance mechanism of the rolled paper PM. The paper transporter 25 conveys the rolled paper PM fed from the paper feeding device 10 to the image former 24 by a plurality of rollers and conveys the rolled paper PM on which images are formed by the image former 24 to the winding device 30.

The fixer 26 includes a fixing roller 261 disposed on a fixing surface (a surface on which toner images are formed) side of the rolled paper PM, a pressure roller 262 disposed on a back surface (a surface opposite to the fixing surface) side of the rolled paper, and the like. When the pressure roller 262 is pressed against the fixing roller 261, a fixing nip for holding and conveying the rolled paper PM is formed.

The fixer 26 fixes the toner images on the rolled paper PM by heating and pressurizing, at the fixing nip, the rolled paper PM which is secondarily transferred and conveyed thereto.

The storage 27 is, for example, a non-volatile memory (so-called flash memory) or a hard disk drive, and stores various programs, various setting data, and the like in a readable and writable manner from the controller 21.

The communicator 28 is an interface that connects the main unit 20 to a communication network such as Local Area Network (LAN), and Wide Area Network (WAN). The communicator 28 includes a communication IC, a communication connector, and the like, and transmits and receives various types of data to and from an external device (for example, a personal computer) connected to the communication network under the control of the controller 21 using a predetermined communication protocol. The communicator 28 can also input and output various types of data via a USB drive.

The ionizer (charge eliminator) 29 is a charge elimination device that is disposed upstream of the transfer position of the secondary transfer roller 242_b_ in the conveyance direction of the rolled paper PM and that eliminates the charge of the rolled paper PM in a non-contact manner. A charge elimination device mainly uses a corona discharge system, which is further subdivided to an AC type, a DC type and the like, but the charge elimination device used as the charge eliminator according to the present invention is not limited to the system as long as it can neutralize the rolled paper PM in a non-contact manner. In the present embodiment, a configuration in which a pulsed AC type of ionizer 29 is employed as the charge elimination device used as the charge eliminator according to the present invention will be described as an example.

Figure 3A:
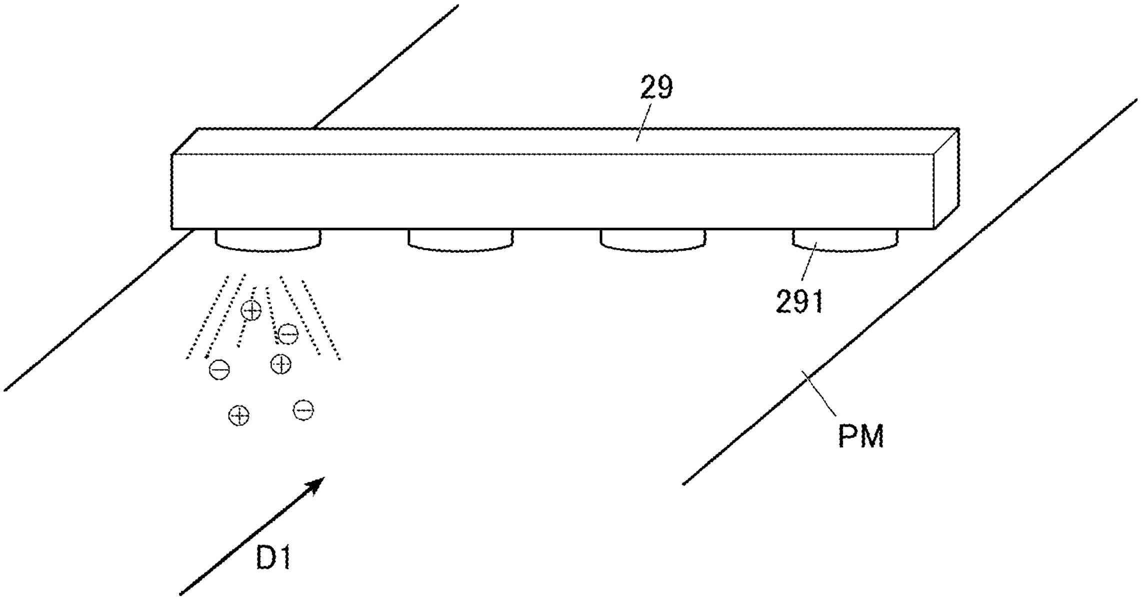
FIG. 3A is a diagram illustrating a schematic configuration and an arrangement of an ionizer.

As shown in FIG. 3A, the ionizer 29 is disposed on the front surface side (base material surface) of the rolled paper PM such that a direction perpendicular to the conveyance direction D1 of the rolled paper PM (a width direction of the rolled paper PM) is a longitudinal direction of the ionizer 29. Thus, the charge eliminating effect can be exerted on the entire width area of the rolled paper PM. The ionizer 29 includes a plurality of a corona discharger 291 along the widthwise direction of the rolled paper PM.

Figure 3B:
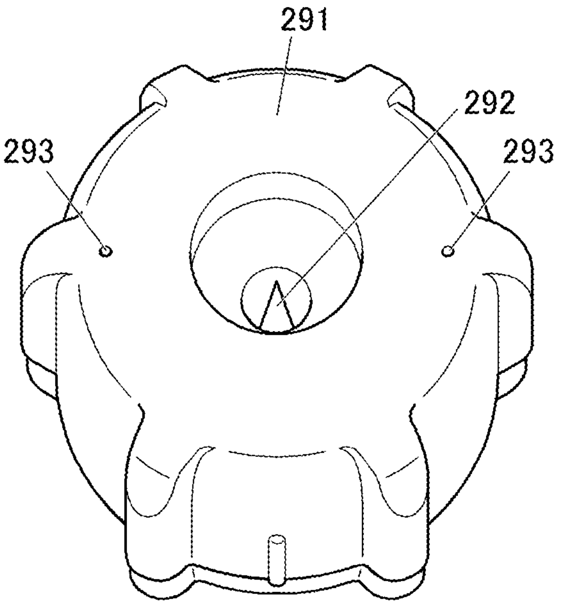
FIG. 3B is perspective view of a corona discharger.
Figure 4:
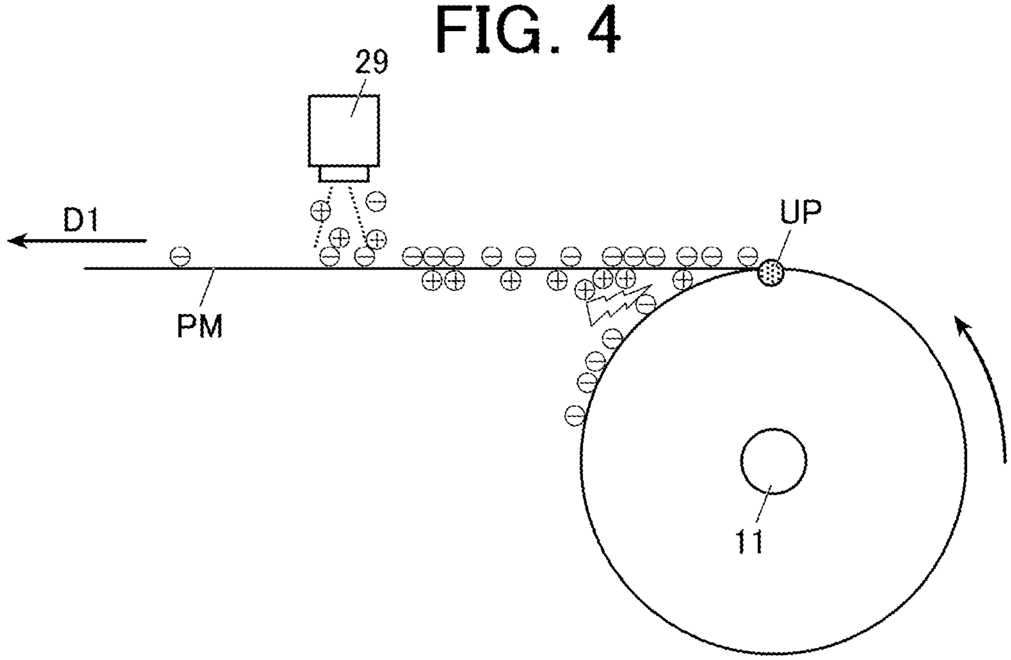
FIG. 4 is a diagram for explaining charge elimination by the ionizer.

The corona discharger 291 includes a needle 292, as shown in FIG. 3B. The controller 21 causes to generate positive ions and negative ions by applying positive/negative respective high-voltages to the needle 292. As shown in FIG. 4, the generated positive ions and negative ions move toward the surface of the charged rolled paper PM, thereby discharging the charged portion of the rolled paper PM.

Figure 5:
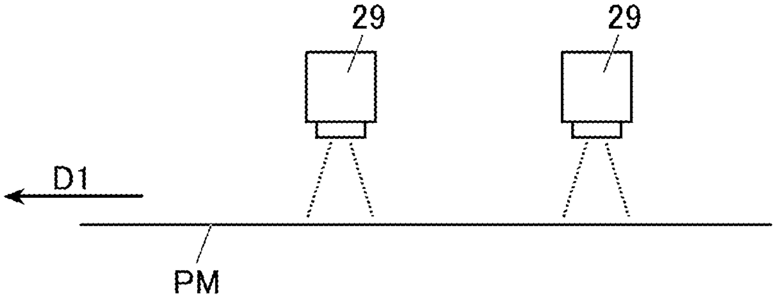
FIG. 5 is a diagram illustrating an example of a configuration in which a plurality of the ionizers are arranged at different positions in a conveying direction of rolled paper.
Figure 6:
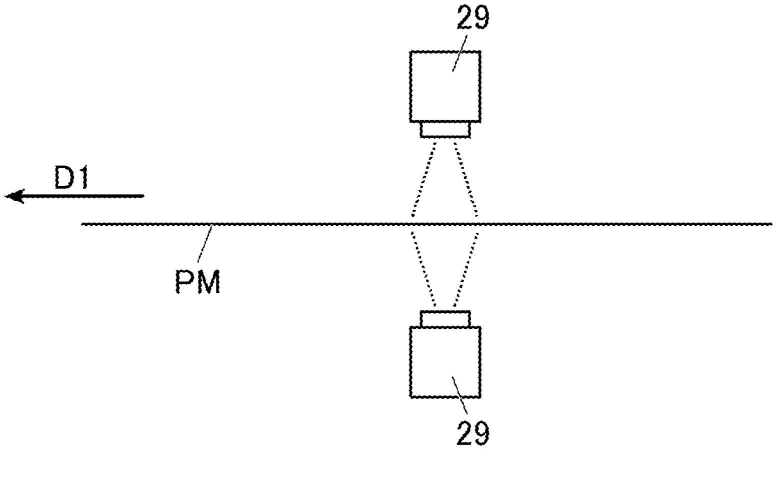
FIG. 6 is a diagram illustrating an exemplary configuration in which the ionizers are disposed at the same position in the conveying direction on the front side and back surface side of the rolled paper, respectively.

Note that, in the present embodiment, a configuration in which one charge eliminator (ionizer 29) is disposed on the front surface side (substrate surface) of the rolled paper PM on the purpose of actively neutralizing the surface to which the toner is transferred has been described as an example, but the present invention is not limited thereto. For example, as shown in FIG. 5, a plurality of (two in the drawing) ionizers 29 may be arranged at different positions in the conveyance-direction D1 of the rolled paper PM. Further, as shown in FIG. 6, the ionizers 29 may be arranged at positions where both the front surface side and back surface side of the rolled paper PM can be neutralized at the same time (that is, arranged at the same position in the conveyance direction D1 of the front surface side and back surface side of the rolled paper PM, respectively). As described above, by arranging a plurality of ionizers 29, the charge elimination effect can be further enhanced. In particular, when a recording medium whose charges tend to increase as in the case of a rolled paper PM is mainly used, it is more preferable to dispose a plurality of ionizers 29.

As described above, the ionizer 29 is disposed upstream of the transfer position in the conveyance-direction D1 of the rolled paper PM (see FIG. 1).

Here, a background in which the ionizer 29 is disposed upstream of the transfer position will be described.

The main unit 20 is arranged to have white toner at the most downstream side, which is advantageous for usage of white toner as an underlayer. In some cases, white toner is drawn down on a rolled paper or the like having a transparent film substrate, and color toner such as Y, M, C, or K is placed on the white toner. Transparent film substrates are resin-based films such as polypropylene (PP), polyethylene terephthalate (PET), polyethylene (PE), which are much more resistant than commonly used paper pulp-based plain paper and high-quality paper. The surface of the rolled paper may be unevenly charged due to peeling discharge that occurs at a timing (unwinding position) at which the rolled paper is peeled off from a roll when the rolled paper is sent out from the roll in a rolled paper form, triboelectrification with rollers provided in a conveyance path from the paper feeding device 10 to the transfer position, or the like. Such uneven charging unevenness on the surface of the rolled paper is visualized by placing the toner thereon, and is recognized as image defects. Further, when there is an underlayer made of white toner, image defects are more easily visually recognized.

That is, in order to suppress the occurrence of image defects it is important to make the charging state of the surface of the rolled paper uniform (or to make the charging state uncharged) before the secondary transfer, so that the ionizer 29 is disposed upstream of the transfer position.

In order to make the charged state of the surface of the rolled paper uniform (or to make the charged state uncharged) before the secondary transfer, it is most preferable to arrange the ionizer 29 immediately before the transfer position (for example, between the transfer position and the closest conveyance roller to the transfer position).

In addition, it is more preferable that the ionizer 29 is arranged such that, in order to reduce the frictional electrification with the roller generated after the charge elimination by the ionizer 29, the charge elimination position for eliminating the rolled paper PM is closer to the transfer position than the intermediate position between the unwinding position UP (see FIGS. 1 and 4) at which the rolled paper PM is unwound from the paper feeding device 10 and the transfer position of the secondary transfer roller 242*b*.

Furthermore, when the plurality of ionizers 29 are used, the charge elimination effect can be enhanced. Even in such cases, it is more preferable that the ionizer 29 is arranged such that a charge elimination position of at least one ionizer 29 is closer to the transfer position than the intermediate position between the unwinding position UP and the transfer position.

As described above, by disposing the ionizer 29 closer to the transfer position than the intermediate position between the unwinding position UP and the transfer position, triboelectrification between the ionizer 29 and the transfer position can be reduced.

Figure 7A:
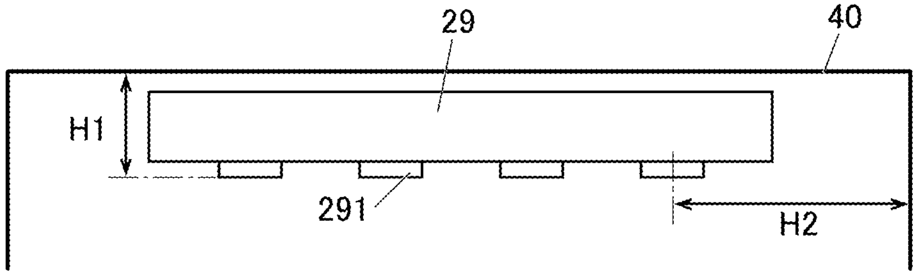
FIG. 7A is a diagram for explaining a distance between the ionizer and a conductor.
Figure 7B:
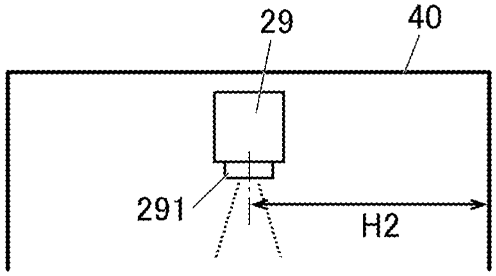
FIG. 7B is another diagram illustrating a distance between the ionizer and the conductor.

In addition, since it is preferable that the ions generated by the ionizer 29 are efficiently poured down onto PM surface of the rolled paper, it is preferable that the conductor 40 that moves the ion particles generated during the charge elimination in the vicinity of the ionizer 29 is not disposed. That is, the ionizer 29 is preferably disposed at a position away from the conductor 40 (for example, a sheet metal or the like) that moves the ion particles generated during the charge elimination by a predetermined distance or more. Here, the predetermined distance refers to a distance to a position substantially unaffected by the conductor 40 (that is, the conductor 40 does not affect the movement of the ion particles). For example, as shown in FIGS. 7A and 7B, the ionizer 29 is preferably spaced apart from the conductor 40 so that H1 from the ion-generating portion (the center of the bottom portion of the corona discharger 291 (the tip of the needle 292)) to the upper conductor 40 is at least 50 mm or more, preferably 100 mm or more. In addition, it is preferable that the ionizer 29 be spaced apart from the conductor 40 so that a distance H2 from the ion-generating portion (the bottom center of the corona discharger 291 (the tip of the needle 292)) to the side conductor 40 is at least 100 mm or more, preferably 150 mm or more. Incidentally, FIG. 7A is a view of the vicinity of the ionizer 29 from the conveying direction of the rolled paper PM, FIG. 7B is a view of the vicinity of the ionizer 29 from a width direction of the rolled paper PM.

Further, in order to efficiently blow out the ions generated by the ionizer 29 toward the rolled paper PM, for example, a compressor may be provided, and air may be discharged from an air hole 293 (see FIG. 3B) provided at the bottom of a corona discharger 291 so as to generate a flow of air in the rolled paper PM direction.

On the other hand, when a corona discharge is generated by the ionizer 29, ozone or the like is also generated, and thus a device for sucking ozone may be provided so that ozone does not leak out. In such cases, it is preferable that the device for sucking the ozone is arranged at a position away from the ionizer 29 (at least at a position where the movement of the ions to the rolled paper PM is not hindered) to suck the ozone.

In addition, in the image forming apparatus 100 of the present embodiment, since there are cases where printing without using white toner is executed or a type of paper (for example, plain paper or the like) without a film substrate is used, it is preferable to control, according to the type of paper, whether the charge elimination operation is performed or not and to what extent the charge elimination operation is to be performed. Therefore, the controller 21 of the present embodiment controls the charge elimination operation of the ionizer 29 according to the type (paper type) of recording medium (rolled paper PM). For example, the controller 21 may be allowed to detect a paper type selected by a user and determine based thereon whether the charge elimination operation is performed or not and to what extent the charge elimination operation is to be performed. Further, for example, the controller 21 may be allowed to cause a detection means to detect resistance of the rolled paper PM set in the paper feeding device 10 and determine based thereon whether the charge elimination operation is performed or not and to what extent the charge elimination operation is to be performed. Moreover, for example, the controller 21 may be allowed to detect a current or voltage when the rolled paper PM is pressed on the secondary transfer roller 242*b* at the transfer position and a predetermined current or voltage is applied thereto, whereby the controller 21 calculates a resistance of the rolled paper PM, and determine whether the charge elimination operation is performed or not and to what extent the charge elimination operation is to be performed if the calculated resistance is equal to or greater than a threshold value. Thus, any means may be used as long as the means can lead to determination of whether the charge elimination operation is performed or not and to what extent the charge elimination operation is to be performed.

In addition, it is preferable to control whether the charge elimination operation is performed or not and to what extent the charge elimination operation is to be performed, according to whether a base image of white toner is formed on a recording medium (rolled paper PM) or not. Therefore, the controller 21 of the present embodiment controls the charge elimination operation of the ionizer 29 according to whether a base image of white toner is formed on a recording medium (rolled paper PM) or not.

In addition, the image forming apparatus 100 of the present embodiment is capable of constantly exhibiting charge elimination, for example, even for a rolled paper PM longer than 1000 m. Therefore, the paper feeding device 10 and the winding device 30 are designed to be capable of setting a rolled paper PM longer than 1000 m. That is, even when a rolled paper PM longer than 1000 m is set, the charge eliminating effect can be obtained, and thus the occurrence of transfer defects can be suppressed and an image with high quality can be outputted.

Furthermore, the image forming apparatus 100 of the present embodiment can constantly exhibit charge elimination, for example, even when a rolled paper PM having a diameter larger than 600 mm in a rolled state is set. Accordingly, the paper feeding device 10 has a configuration which is capable of setting the rolled paper PM whose diameter in a rolled state is larger than 600 mm, and the winding device 30 has a configuration which is capable of winding the rolled paper PM whose diameter in a rolled state is larger than 600 mm. That is, even when a rolled paper PM whose diameter in a rolled state is larger than 600 mm is set, the charge elimination effect can be obtained, so that the occurrence of transfer defects can be suppressed and an image with high quality can be outputted.

The controller 21 of the image forming apparatus 100 of the present embodiment also controls an image forming speed for the rolled paper PM. That is, the controller 21 functions as a speed controller of the present invention. The controller 21 can set the image forming speed to be faster than 23.4 m/min in order to increase the productivity. However, it has been found that the higher the image forming speed is, the larger peeling discharge at the timing (unwinding position UP) at which the rolled paper PM is peeled off from the roll-state is, which leads to higher possibility of occurrence of image defects and more necessity of the ionizer 29.

On the other hand, when plain paper or coated paper which is relatively unlikely to lead to peeling discharge is used, it is preferable to set the image forming speed to be higher than that of 23.4 m/min since it is desired to increase productivity.

Here, in the case where the material of the base material is a high-resistance resin film and is transparent, the amount of deposited toner is often relatively large since printing in which color toner is placed on a base formed by white toner is mainly carried out. Therefore, from the viewpoint of the fixing property of the toner to the film and the viewpoint of the visibility of image defects due to the peeling discharge, it is preferable that the image forming speed be adjustable between the case where the white toner is used and the case where the white toner is not used. Therefore, the controller 21 of the image forming apparatus 100 of the present embodiment functions as an image forming controller capable of executing a first mode in which an image is formed using white toner and a second mode in which an image is formed without using white toner. Then, the controller 21 is capable of adjusting the image forming speed between the case where the white toner is used and the case where the white toner is not used. For example, when the second mode is executed, the controller 21 makes the image forming speed faster than 23.4 m/min which is the speed at the time of executing the first mode. Accordingly, optimum productivity and image quality can be ensured in accordance with print jobs of a user.

Also, in some cases, white toner is used for undercoating and in other cases, white toner is not used for undercoating, even when a transparent film substrate is used. In addition, in some cases, color toner is deposited thereon in a way of low coverage such as halftone and in other cases, color toner is deposited thereon in a way of high coverage in which as a solid image having a plurality of colors is formed thereon.

On the other hand, in some cases, it may be easy to visually recognize image defects caused by the peeling discharge and in other cases, it may be difficult to visually recognize image defects caused by the peeling discharge, depending on coverage of an image formed on a recording medium (rolled paper PM).

Therefore, in the present embodiment, the controller 21 controls the charge elimination operation of the ionizer 29 in accordance with coverage of an image formed on a recording medium (rolled paper PM), so that excessive charge elimination can be suppressed. For example, when the coverage is extremely small or extremely large, the present embodiment can prevent the charge elimination operation from being executed or reduce the degree of the charge elimination since it is difficult to visually recognize image defects and therefore, it is not necessary to actively eliminate the charge.

Further, it has been found that the degree of image defects varies depending on an image forming speed. Therefore, in the present embodiment, the controller 21 controls the charge elimination operation of the ionizer 29 in accordance with an image forming speed of a recording medium (rolled paper PM), so that excessive charge elimination can be suppressed. For example, when the image forming speed is slow, peeling discharge and frictional electrification are less likely to occur, and the degree of image defects is lighter, so that there is no need to actively remove the charge, so that it is possible to prevent the charge eliminating operation from being executed or to reduce the degree of charge elimination.

It has also been found that the degree of image defects varies depending on the environmental conditions (humidities) in which the image forming apparatus 100 is placed. Therefore, in the present embodiment, a humidity sensor (a humidity detector) Si for detecting humidity in the image forming apparatus 100 is provided (see FIG. 2), and the charge eliminating operation of the ionizer 29 is controlled by the controller 21 in accordance with the humidity detected by the humidity sensor S 1, whereby excessive charge elimination can be suppressed. For example, it has been found that image defects are likely to occur in a low humidity environment, and image defects are unlikely to occur in a high humidity environment. That is, in a high humidity environment, it is not necessary to actively eliminate charges, and thus it is possible to prevent the charge elimination operation from being executed or to reduce the degree of the charge elimination.

Further, the controller 21 controls the charge elimination operation of the ionizer 29 in accordance with at least one of the type of the rolled paper PM, the coverage of the image formed on the rolled paper PM, the image forming speed with respect to the rolled paper PM, and the humidity detected by the humidity sensor Si, which makes it possible to carry out finer control and suppress excessive charge elimination operation.

In addition, although the present embodiment exemplifies a configuration in which the ionizer 29 is employed as a charge eliminator of the present invention, the present invention is not limited thereto. For example, instead of the ionizer 29, a charge eliminating string may be adopted. The charge eliminating string has a function of inducing corona discharge between fibers of the string and a charged object by bringing the charge eliminating string closer to the charge object, to eliminate the charges of the charged object. However, since discharge due to the charge elimination string is smaller than discharge due to the ionizer 29, the ionizer 29 has larger charge elimination effect.

Experimental results for confirming the effectiveness of the present embodiment will now be described with reference to FIG. 8A and FIG. 8B.

Experiments (verifications) for confirming the effectiveness of the present embodiment compare image defects due to peeling discharge between a configuration (Example) including the ionizer 29 according to the present embodiment and a configuration (Comparative Example) not including the ionizer 29.

FIGS. 8A and 8B illustrates examples of experimental results for confirming the effectiveness of the present embodiment. FIG. 8A shows a chart showing an example of experimental results using rolled paper PM, and FIG. 8B shows a chart showing an example of experimental results using cut paper.

Examples 1-3 employed an ionizer 29 as a charge eliminator. In Comparative Examples 1, 3, and 5, a charge eliminator was not employed. In Comparative Examples 2 and 4, a charge eliminating string was employed as the charge eliminator of the present invention.

In Example 1 and Comparative Examples 1 and 2, a tack film 1, which is a film medium having a transparent base material, was used as a rolled paper PM or a cut paper. The print condition in which the tack film 1 is used was 10 m continuous printing of SRA3-size Bk halftone images superposed on white solid images.

In Example 2 and Comparative Examples 3 and 4, a tack film 2, which is a film medium having a white base material, was used as the rolled paper PM or the cut paper. The print condition in which the tack film 2 is used was 10 m continuous printing of SRA3-size Bk halftone images superposed on the white tack film 2.

In Example 3 and Comparative Example 5, as the rolled paper PM or the cut paper, tack plain paper, which is a tack medium based on white plain paper, was used. The print condition in which the tack plain paper is used was 10 m continuous printing of SRA3-size Bk halftone images superposed on the white tack plain paper.

In the FIGS. 8A and 8B, the images printed in the above-described manner are visually evaluated. Here, the notation of "A", "B", and "C" in the item of the image defects indicating the evaluation result indicates the following meaning: A: There are no image defects. B: A few image defects have occurred. C: Image defects have occurred.

As shown in FIG. 8A, in the experiment using the rolled paper PM, the evaluation result in Example 1 to 3 in which the ionizer 29 was adopted as a charge eliminator was "A", and good results were obtained. On the other hand, the evaluation results in Comparative Examples 1, 3, and 5 in which a charge eliminator was not employed were "C", and good results were not obtained. In Comparative Examples 2 and 4 in which the neutralization string was used as a charge eliminator was "B", and the results were not as good as those of Example 1 to 3 in which the ionizer 29 was used.

Further, as shown in FIG. 8B, in the experiment using the cut paper, the same result as the experiment using the rolled paper PM was obtained.

As described above, in both the experiment using the rolled paper PM and the experiment using the cut paper, it was found that the generation (degree) of the image defects could be suppressed in the configuration using the ionizer 29 (Example 1 to 3) compared to the configuration not using the ionizer 29 (Comparative Examples 1 to 5).

As described above, an image forming apparatus 100 of the present embodiment includes: a developing device (developing apparatus 241*b*) that forms a toner image on an image carrier (photoreceptor drum 241*a*), a transfer device (secondary transfer roller 242*b*) that transfers the toner image formed by the developing device to a recording medium (rolled paper PM) at a transfer position, and a charge eliminator (ionizer 29) that is arranged upstream of the transfer position in a conveyance direction of the recording medium and eliminates charges of the recording medium in a non-contact manner. In addition, the charge eliminator is an ionizer and is arranged at a position which is away by a predetermined distance from a conductor for moving ionic particles generated at the time of charge elimination.

Therefore, according to the image forming apparatus 100 of the present embodiment, since recording medium can be neutralized in a non-contact manner prior to the transfer, occurrence of transfer defects can be suppressed, and an image with high quality can be outputted. In addition, since the effect of the conductor 40 on the ion particles generated by the ionizer 29 can be substantially eliminated, the ion particles can be efficiently moved toward the surface of the recording medium, and the recording medium can be efficiently neutralized.

Further, the image forming apparatus 100 of the present embodiment includes: a developing device (developing apparatus 241*b*) that forms a toner image on an image carrier (photoreceptor drum 241*a*) with white toner and toner of colors other than white, a transfer device (secondary transfer roller 242*b*) that transfers the toner image formed by the developing device to a recording medium (rolled paper PM) at a transfer position, and a charge eliminator (ionizer 29) that is arranged upstream of the transfer position in a conveyance direction of the recording medium and eliminates charges of the recording medium in a non-contact manner.

Therefore, according to the image forming apparatus 100 of the present embodiment, since recording medium can be neutralized in a non-contact manner prior to the transfer, occurrence of transfer defects can be suppressed, and an image with high quality can be outputted.

According to the image forming apparatus 100 of the present embodiment, the recording medium is a film made of resin. In addition, the recording medium is continuous paper (rolled paper PM).

Therefore, according to the image forming apparatus 100 of the present embodiment, since the recording medium made of a rolled paper PM in which peeling discharge occurs can be neutralized at a timing of peeling off from a resin film or roll in which discharge in the transfer device is particularly likely to occur, occurrence of transfer defects can be suppressed and an image with high quality can be outputted even in a case where a resin film or rolled paper PM is used.

Further, according to the image forming apparatus 100 of the present embodiment, the ionizer 29 includes the plurality of corona dischargers 291 along a direction perpendicular to the conveyance direction of the recording medium.

Therefore, according to the image forming apparatus 100 of the present embodiment, it is possible to eliminate charges across the recording medium in the widthwise direction. Therefore, it is possible to uniformly eliminate the charges over the entire surface of the recording medium, and thus it is possible to more reliably suppress the occurrence of the transfer defects.

Further, the image forming apparatus 100 of the present embodiment includes the controller 21 that controls the charge elimination operation of the charge eliminator according to a type of the recording medium.

Therefore, according to the image forming apparatus 100 of the present embodiment, since the charge elimination operation can be controlled according to the type of recording medium (different charge characteristics), the charge elimination can be appropriately performed according to the characteristics of the respective recording medium, and excessive charge elimination and insufficient charge elimination can be suppressed.

Further, the image forming apparatus 100 of the present embodiment includes the controller 21 that controls the charge elimination operation of the charge eliminator according to whether a base image of white toner is formed on the recording medium or not.

Therefore, according to the image forming apparatus 100 of the present embodiment, since it is possible to control the charge elimination operation according to whether a base image of white toner is formed on the recording medium or not, it is possible to adjust the degree of charge elimination or the like, and it is possible to appropriately eliminate the charge, for example, when the image defects becomes easy to be visually recognized as in the case of forming the base image by using the white toner.

According to the image forming apparatus 100 of the present embodiment, the continuous paper is longer than 1000 m. In addition, the image forming apparatus 100 of the present embodiment includes a paper feeder (paper feeding device 10) on which the continuous paper wound in a roll shape is set, wherein the continuous paper wound in a roll shape which has a diameter of more than 600 mm is set on the paper feeder.

Therefore, according to the image forming apparatus 100 of the present embodiment, even when continuous paper longer than 1000 m is used or when continuous paper having a larger diameter than 600 mm is used in a rolled state, it is possible to constantly obtain a charge elimination effect. Therefore, an image with high quality can be outputted over a long period of time.

Further, the image forming apparatus 100 of the present embodiment includes a hardware processor (controller 21) for controlling an image forming speed for the continuous paper; wherein the hardware processor is capable of making the image forming speed higher than 23.4 m/min.

Therefore, according to the image forming apparatus 100 of the present embodiment, even in the speed setting (setting in which the image forming speed becomes higher than 23.4 m/min speed) in which continuous paper is easily charged in the process of reaching the transfer position, it is possible to appropriately eliminate the charge prior to the transfer, and thus it is possible to output an image with high quality.

Further, the image forming apparatus 100 of the present embodiment includes a hardware processor (controller 21) that is capable of executing a first mode of forming an image by using white toner and a second mode of forming an image without using the white toner, and the hardware processor makes the image forming speed higher than 23.4 m/min when the hardware processor executes the second mode.

Therefore, according to the image forming apparatus 100 of the present embodiment, even when the second mode is executed while the image forming speed is set to be higher than 23.4 m/min, in order to form an image with toner of colors other than white without using the white toner, it is possible to appropriately eliminate the charge prior to the transfer, and thus it is possible to output an image with high quality.

Further, the image forming apparatus 100 of the present embodiment includes a paper feeder (paper feeding device 10) on which the continuous paper wound in a roll shape is set, wherein the charge eliminator is arranged on an elimination position for eliminating charges of the continuous paper which is closer to the transfer position than an intermediate position between an unwinding position at which the continuous paper is unwound from a paper feeder and a transfer position of the transfer device.

Therefore, according to the image forming apparatus 100 of the present embodiment, it is possible to reduce the frictional electrification with the roller, that is generated after the charge elimination of the charge eliminator, and thus it is possible to suppress the occurrence of transfer defects, and thus it is possible to output an image with high quality.

Further, according to the image forming apparatus 100 of the present embodiment, a plurality of the charge eliminators are arranged at different positions in the conveyance direction D1 of the recording medium.

Therefore, according to the image forming apparatus 100 of the present embodiment, it is possible to improve the charge elimination effectiveness regardless of the type of recording medium to be used, and thus it is possible to more reliably output an image with high quality.

In addition, according to the image forming apparatus 100 of the present embodiment, at least one of the charge eliminators is arranged on the elimination position which is closer to the transfer position than the intermediate position.

Therefore, according to the image forming apparatus 100 of the present embodiment, it is possible to reduce the frictional electrification with the roller generated after the charge elimination of the charge eliminator, and thus it is possible to suppress the occurrence of transfer defects, and thus it is possible to output an image with high quality.

Further, according to the image forming apparatus 100 of the present embodiment, the charge eliminators are arranged at positions where charges of both a front side and a back surface side of the continuous paper can be eliminated simultaneously.

Therefore, according to the image forming apparatus 100 of the present embodiment, it is possible to obtain a synergistic effect by simultaneously discharging the charge from the front and back sides of the continuous paper, and thus it is possible to more efficiently discharge the charge, and it is possible to more reliably suppress the occurrence of the transfer defects.

Further, the image forming apparatus 100 of the present embodiment include the controller 21 that controls the charge elimination operation of the charge eliminator according to coverage of an image formed on the recording medium.

Therefore, according to the image forming apparatus 100 of the present embodiment, since the charge elimination operation can be controlled in accordance with the coverage in which the visibility is changed when image defects has occurred, the charge elimination can be appropriately performed, and excessive charge elimination and insufficient charge elimination can be suppressed.

Further, the image forming apparatus 100 of the present embodiment includes the controller 21 that controls the charge elimination operation of the charge eliminator according to an image forming speed for the recording medium.

Therefore, according to the image forming apparatus 100 of the present embodiment, since the charge elimination operation can be controlled in accordance with the image forming speed at which the degree of the image defects changes, the charge elimination can be appropriately performed, and excessive charge elimination and insufficient charge elimination can be suppressed.

Further, the image forming apparatus 100 of the present embodiment includes a humidity detector (humidity sensor Si) for detecting humidity in the image forming apparatus, and the controller 21 that controls the charge elimination operation of the charge eliminator according to the humidity detected by the humidity detector.

Therefore, according to the image forming apparatus 100 of the present embodiment, it is possible to control the charge elimination operation according to the installation environment (humidity) of the apparatus in which the degree of the image defects changes, and thus it is possible to appropriately eliminate the charge, and it is possible to suppress excessive charge elimination and insufficient charge elimination.

Further, the embodiment of the image forming apparatus 100 includes a humidity detector (humidity sensor Si) for detecting humidity in the image forming apparatus, and the controller 21 that controls the charge elimination operation of the charge eliminator according to at least one of a type of the recording medium, coverage of an image formed on the recording medium, an image forming speed for the recording medium, and the humidity detected by the humidity detector.

Therefore, according to the image forming apparatus 100 of the present embodiment, combination of at least one of the coverage in which the visibility changes when the charging property or the image defects occurs, the image forming speed in which the degree of the image defects changes, and the installation environment (humidity) of the apparatus, makes it possible to perform finer control, so that it is possible to more appropriately eliminate the charge, and it is possible to more reliably suppress excessive charge elimination and insufficient charge elimination.

Although the present invention has been described in detail based on embodiment according to the present invention, the present invention is not limited to the above embodiment and can be modified without departing from the gist thereof.

For example, in the above embodiment, the secondary transfer roller 242*b* is exemplified as a transfer device of the present invention, but the present invention is not limited thereto. For example, instead of the secondary transfer roller 242*b*, a configuration in which a secondary transfer belt is stretched in a loop-like manner (a so-called belt-type secondary transfer unit) may be adopted for a plurality of support rollers including the secondary transfer roller 242*b*.

In the above embodiment, a configuration (see FIG. 1) in which the ionizer 29 is incorporated in the main unit 20 is described as an example, but the present invention is not limited thereto. For example, the ionizer 29 may be built in the paper feeding device 10, or a housing that houses the ionizer 29 may be provided between the paper feeding device 10 and the main unit 20.

In the above embodiment, as shown in FIG. 6, the ionizer 29 is disposed at the same position in the conveyance-direction D1 on the front side and back surface side of the rolled paper PM, but the present invention is not limited thereto. For example, the ionizer 29 may be disposed at different positions in the conveying direction D1 on the front surface side and back surface side of the rolled paper PM, respectively, and the charge elimination of the front and back surfaces of the rolled paper PM may be performed at different timings.

In addition, the detailed configuration of each device constituting an image forming apparatus and the detailed operation of each device can be appropriately changed without departing from the gist of the present invention.

Although embodiments of the present invention have been described and illustrated in detail, the disclosed embodiments are made for purposes of illustration and example only and not limitation. The scope of the present invention should be interpreted by terms of the appended claims.

The invention claimed is:

1. An image forming apparatus forming an image on a recording medium, comprising:

a developing device that forms a toner image on an image carrier, a transfer device that transfers the toner image formed by the developing device to a recording medium at a transfer position, and a charge eliminator that is arranged upstream of the transfer position in a conveyance direction of the recording medium and eliminates charges of the recording medium in a non-contact manner, wherein the charge eliminator is an ionizer and is arranged at a position which is away by a predetermined distance from a conductor for moving ionic particles generated at the time of charge elimination.

2. The image forming apparatus according to claim 1, wherein the recording medium is a film made of resin.

3. The image forming apparatus according to claim 1, wherein the recording medium is continuous paper.

4. The image forming apparatus according to claim 1, wherein the ionizer includes a plurality of corona dischargers along a direction perpendicular to the conveyance direction of the recording medium.

5. The image forming apparatus according to claim 1, further comprising a controller that controls the charge elimination operation of the charge eliminator according to a type of the recording medium.

6. The image forming apparatus according to claim 1, further comprising a controller that controls the charge elimination operation of the charge eliminator according to whether a base image of white toner is formed on the recording medium or not.

7. The image forming apparatus of claim 3, wherein the continuous paper is longer than 1000 m.

8. The image forming apparatus of claim 3, further comprising a paper feeder on which the continuous paper wound in a roll shape is set, wherein the continuous paper wound in a roll shape which has a diameter of more than 600 mm is set on the paper feeder.

9. The image forming apparatus of claim 3, further comprising a hardware processor for controlling an image forming speed for the continuous paper; wherein the hardware processor is capable of making the image forming speed higher than 23.4 m/min.

10. The image forming apparatus of claim 9, wherein the hardware processor is capable of executing a first mode of forming an image by using white toner and a second mode of forming an image without using the white toner, and the hardware processor hardware processor makes the image forming speed higher than 23.4 m/min when the hardware processor executes the second mode.

11. The image forming apparatus of claim 3, further comprising a paper feeder on which the continuous paper wound in a roll shape is set, wherein the charge eliminator is arranged on an elimination position for eliminating charges of the continuous paper which is closer to the transfer position than an intermediate position between an unwinding position at which the continuous paper is unwound from a paper feeder and a transfer position of the transfer device.

12. The image forming apparatus according to claim 11, wherein a plurality of the charge eliminators are arranged at different positions in the conveyance direction of the recording medium.

13. The image forming apparatus according to claim 12, wherein at least one of the charge eliminators is arranged on the elimination position which is closer to the transfer position than the intermediate position.

14. The image forming apparatus according to claim 12, wherein the charge eliminators are arranged at positions where charges of both a front side and a back surface side of the continuous paper can be eliminated simultaneously.

15. The image forming apparatus according to claim 1, further comprising a controller that controls the charge elimination operation of the charge eliminator according to coverage of an image formed on the recording medium.

16. The image forming apparatus according to claim 1, further comprising a hardware processor that controls the charge elimination operation of the charge eliminator according to an image forming speed for the recording medium.

17. The image forming apparatus according to claim 1, further comprising:

a humidity detector for detecting humidity in the image forming apparatus, and a hardware processor that controls the charge elimination operation of the charge eliminator according to the humidity detected by the humidity detector.

18. The image forming apparatus according to claim 1, further comprising:

a humidity detector for detecting humidity in the image forming apparatus, and a hardware processor that controls the charge elimination operation of the charge eliminator according to at least one of a type of the recording medium, coverage of an image formed on the recording medium, an image forming speed for the recording medium, and the humidity detected by the humidity detector.

19. An image forming apparatus forming an image on a recording medium, comprising:

a developing device that forms a toner image on an image carrier with white toner and toner of colors other than white, a transfer device that transfers the toner image formed by the developing device to a recording medium at a transfer position, and a charge eliminator that is arranged upstream of the transfer position in a conveyance direction of the recording medium and eliminates charges of the recording medium in a non-contact manner.

20. The image forming apparatus according to claim 19, wherein the charge eliminator is an ionizer.

21. The image forming apparatus according to claim 19, wherein the recording medium is a film made of resin.

22. The image forming apparatus according to claim 19, wherein the recording medium is continuous paper.

23. The image forming apparatus according to claim 20, wherein the ionizer includes a plurality of corona dischargers along a direction perpendicular to the conveyance direction of the recording medium.

24. The image forming apparatus according to claim 19, further comprising a controller that controls the charge elimination operation of the charge eliminator according to a type of the recording medium.

25. The image forming apparatus according to claim 19, further comprising a controller that controls the charge elimination operation of the charge eliminator according to whether a base image of white toner is formed on the recording medium or not.

26. An image forming apparatus of claim 22, wherein the continuous paper is longer than 1000 m.

27. The image forming apparatus of claim 22, further comprising a paper feeder on which the continuous paper wound in a roll shape is set, wherein the continuous paper wound in a roll shape which has a diameter of more than 600 mm is set on the paper feeder.

28. The image forming apparatus of claim 22, further comprising a hardware processor for controlling an image forming speed for the continuous paper; wherein the hardware processor is capable of making the image forming speed higher than 23.4 m/min.

29. The image forming apparatus of claim 28, wherein the hardware processor is capable of executing a first mode of forming an image by using white toner and a second mode of forming an image without using the white toner, and the hardware processor hardware processor makes the image forming speed higher than 23.4 m/min when the hardware processor executes the second mode.

30. The image forming apparatus of claim 22, further comprising a paper feeder on which the continuous paper wound in a roll shape is set, wherein the charge eliminator is arranged on an elimination position for eliminating charges of the continuous paper which is closer to the transfer position than an intermediate position between an unwinding position at which the continuous paper is unwound from a paper feeder and a transfer position of the transfer device.

31. The image forming apparatus according to claim 30, wherein a plurality of the charge eliminators are arranged at different positions in the conveyance direction of the recording medium.

32. The image forming apparatus according to claim 31, wherein at least one of the charge eliminators is arranged on the elimination position which is closer to the transfer position than the intermediate position.

33. The image forming apparatus according to claim 32, wherein the charge eliminators are arranged at positions where charges of both a front side and a back surface side of the continuous paper can be eliminated simultaneously.

34. The image forming apparatus according to claim 19, further comprising a controller that controls the charge elimination operation of the charge eliminator according to coverage of an image formed on the recording medium.

35. The image forming apparatus according to claim 19, further comprising a hardware processor that controls the charge elimination operation of the charge eliminator according to an image forming speed for the recording medium.

36. The image forming apparatus according to claim 19, further comprising:

a humidity detector for detecting humidity in the image forming apparatus, and a hardware processor that controls the charge elimination operation of the charge eliminator according to the humidity detected by the humidity detector.

37. The image forming apparatus according to claim 19, further comprising a humidity detector for detecting humidity in the image forming apparatus, and a hardware processor that controls the charge elimination operation of the charge eliminator according to at least one of a type of the recording medium, coverage of an image formed on the recording medium, an image forming speed for the recording medium, and the humidity detected by the humidity detector.

* * * * *